March 29, 1932. P. HOGAN 1,851,837
IMPLEMENT FOR USE IN APPLYING A COATING OF SOLDER TO CYLINDRICAL OBJECTS
Filed May 13, 1931
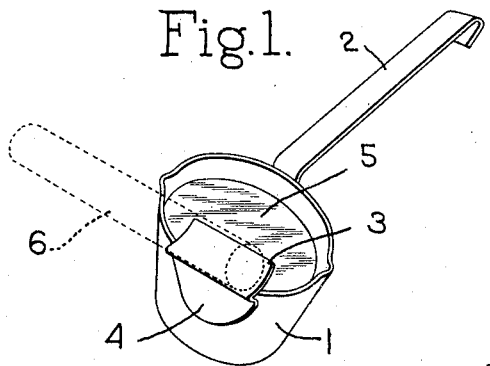
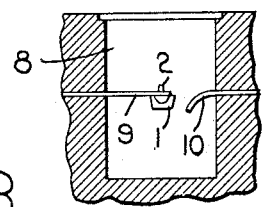
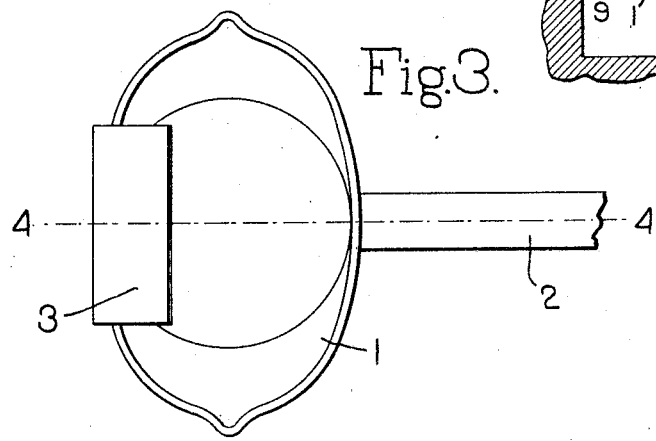
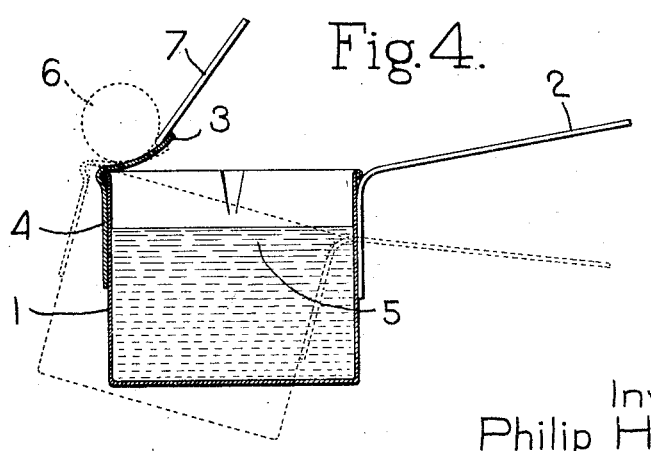
Inventor.
Philip Hogan
by Heard Smith & Tennant.
Attys.

Patented Mar. 29, 1932

1,851,837

UNITED STATES PATENT OFFICE

PHILIP HOGAN, OF NEWTON, MASSACHUSETTS

IMPLEMENT FOR USE IN APPLYING A COATING OF SOLDER TO CYLINDRICAL OBJECTS

Application filed May 13, 1931. Serial No. 537,014.

This invention relates to an implement for use in applying a coating of solder, i. e., "tinning", a cylindrical object, and while the invention is capable of more or less general use the device herein illustrated has been particularly designed for use in connection with the splicing of lead-covered cables used for transmission lines, such for instance as communication lines or electric power transmission lines.

In splicing together the ends of two lead-covered transmission cables, the lead sheath is stripped from the ends of the wires for a short distance and then the wires are properly spliced and insulated. A joint sleeve of lead is then placed over the spliced wires and the ends of the sleeve are soldered to the lead sheaths of the two cable ends.

In providing a proper soldered connection it is desirable that the ends of the lead sheaths of the cable should be tinned, that is, they should be provided with a coating of solder at the points where the soldered joint is to be made. It is not so difficult to apply a coating of solder to the top surface of a cylindrical object such as a lead sheath, but it is difficult to properly tin the under side of such an object and the implement herein illustrated and described is specially designed for this purpose.

In the splicing of a lead-covered transmission cable it is customary to pour hot paraffin over the spliced ends of the wires and in my co-pending application filed May 13, 1931, Serial No. 537,013, there is disclosed the idea of making a sweated joint between the sleeve and the lead sheath of the transmission cable by first tinning or coating with solder the lead sheath at the point where the joint is to be made with the ends of the sleeve, and after bringing the sleeve into contact with the tinned sheath pouring over the joint a hot liquid such as melted paraffin or heated oil, which has a temperature higher than the fusing point of the solder with which the contacting parts have been tinned or coated so that the heat from the hot liquid as it is poured over the joint will fuse the solder and thus make the desired joint.
By my present invention I have provided a ladle-like member which may be used for thus pouring the hot paraffin or hot oil over the joint and which is also constructed so that it can be used for tinning the under side of the sheath. This is accomplished by making the ladle-like member with a solder-applying flange arranged to be brought into contact with the under side of the sheath. When the ladle is filled with the hot paraffin or hot liquid the heat thereof is conducted to the flange so that when the flange is applied to the under side of the lead sheath it will heat the latter. This heat is sufficient to melt the low-fusing solder and by applying solder of this character to the heated flange while it is in contact with the sheath and rubbing the flange on the surface of the sheath, a coating of the solder will be applied to the under side of the sheath, it being understood, of course, that before this is done the sheath must be properly prepared by scraping its surface to provide a fresh bright surface and applying thereto a suitable flux.

The flange above referred to thus functions as a soldering iron and it is heated from the hot liquid contained in the ladle.

In order to give an understanding of the invention I have illustrated in the drawings a selected embodiment thereof which will now be described after which the novel features will be pointed out in the appended claim.

Fig. 1 is a perspective view of an implement embodying my invention illustrating its manner of use;

Fig. 2 is a fragmentary view showing a manhole with two transmission cables leading into it which are to be spliced;

Fig. 3 is a top plan view of the implement;

Fig. 4 is a section on the line 4—4, Fig. 3;

I have recited above the method commonly employed in splicing together two ends of lead-covered transmission lines, one step in which method is to apply a coating of solder to the exterior of the lead sheaths of the transmission cable at the point where the joint sleeve is to be soldered thereto, and I have also referred to the fact that one method of making the soldered joint is to pour a hot liquid, such as heated paraffin or hot oil, over the solder-coated ends of the sleeve after the latter is in position to be soldered, the hot liquid having a temperature sufficient to fuse the solder coating on the sheath and the sleeve thereby making a sweated joint.

In carrying out this method, it is desirable to use a solder having a fusing point considerably below the flashing point of the liquid used and, of course, the liquid must be heated to a temperature somewhat higher than the fusing temperature of the solder.

The implement forming the basis of the present invention is one which can be used not only for thus pouring the hot paraffin or hot oil over the joint but also for tinning or applying a coating of solder to the sheath. This implement is in the nature of a ladle or dipper 1 provided with a usual handle 2 by which it can be manipulated. This dipper or ladle is formed with, or has rigidly secured thereto, a solder-applying flange 3, the upper surface preferably having a slight concave curvature. This flange may be situated in any convenient location, preferably at the upper edge of the dipper or ladle. In the drawings it is shown as not only at the upper edge but also as situated over the open top of the ladle. As stated above, the flange may be made integral with the ladle or rigidly secured thereto in any approved way. In the construction shown it is formed with a skirt portion 4 which is riveted or otherwise rigidly secured to the side wall of the ladle.

As stated above, this ladle is intended to contain melted paraffin or hot oil indicated at 5, this melted paraffin and oil having a temperature considerably higher than the fusing point of the solder with which the lead sheath or other cylindrical object is to be coated. When the ladle is filled with this hot liquid the heat of the liquid is conducted to the flange 3 and the latter is thus maintained at a sufficiently high temperature so that it can be used as a soldering iron for applying a coating of solder to a cylindrical object 6 such as the lead sheath of a transmission cable.

In using the implement the latter is filled with the hot liquid 5 and then it is placed beneath the sheath or other cylindrical object 6 as shown in Figs. 1 and 2. A stick 7 of solder is then applied to the heated flange 3 as shown in Fig. 4 with the result that the solder will become melted.

The heated flange 3 and the stick of solder may be rubbed over the under surface of the sheath with the result that the desired coating of solder will be applied thereto. During this operation the flange 3 functions as a soldering iron and the heat necessary for heating this soldering iron is derived from the melted paraffin, hot oil or other hot liquid 5 contained in the ladle.

It will be understood, of course, that as a preliminary step the lead sheath or other cylindrical object 6 will be scraped or otherwise cleaned so that it presents a bright clean surface and any usual or desirable soldering flux will be applied thereto.

This implement is specially adapted for use in applying a coating of solder to the end of a lead-covered transmission cable which is located in a manhole or other cramped quarters.

In Fig. 2 such a manhole is indicated at 8 and the ends of two lead-covered transmission cables are let into the manhole and which are to be spliced, are indicated at 9 and 10. With my improvement the operation of tinning the under sides of the ends of these cables is very greatly facilitated because it is relatively easy to place the ladle containing the melted paraffin or other liquid in position so that the flange 3 thereof will engage the under side of the lead sheath and by properly manipulating the ladle and applying the solder the tinning operation can be quickly and effectively accomplished.

While I have described the invention as particularly adapted for applying a coating of solder to the under side of lead-covered transmission cables yet the invention is not limited to this use but is capable of use in other relations for a similar purpose.

I claim:

An implement for use in applying a coating of solder to a cylindrical object comprising a ladle-like member adapted to hold liquid at a temperature somewhat higher than the melting point of the solder to be applied, and a solder-applying flange rigidly secured to said ladle-like member and adapted to be placed in contact with the under side of the cylindrical object, the heat from the hot liquid contained in the ladle heating the solder-applying flange sufficiently to fuse the solder applied thereto.

In testimony whereof, I have signed my name to this specification.

PHILIP HOGAN.